United States Patent Office 3,448,042
Patented June 3, 1969

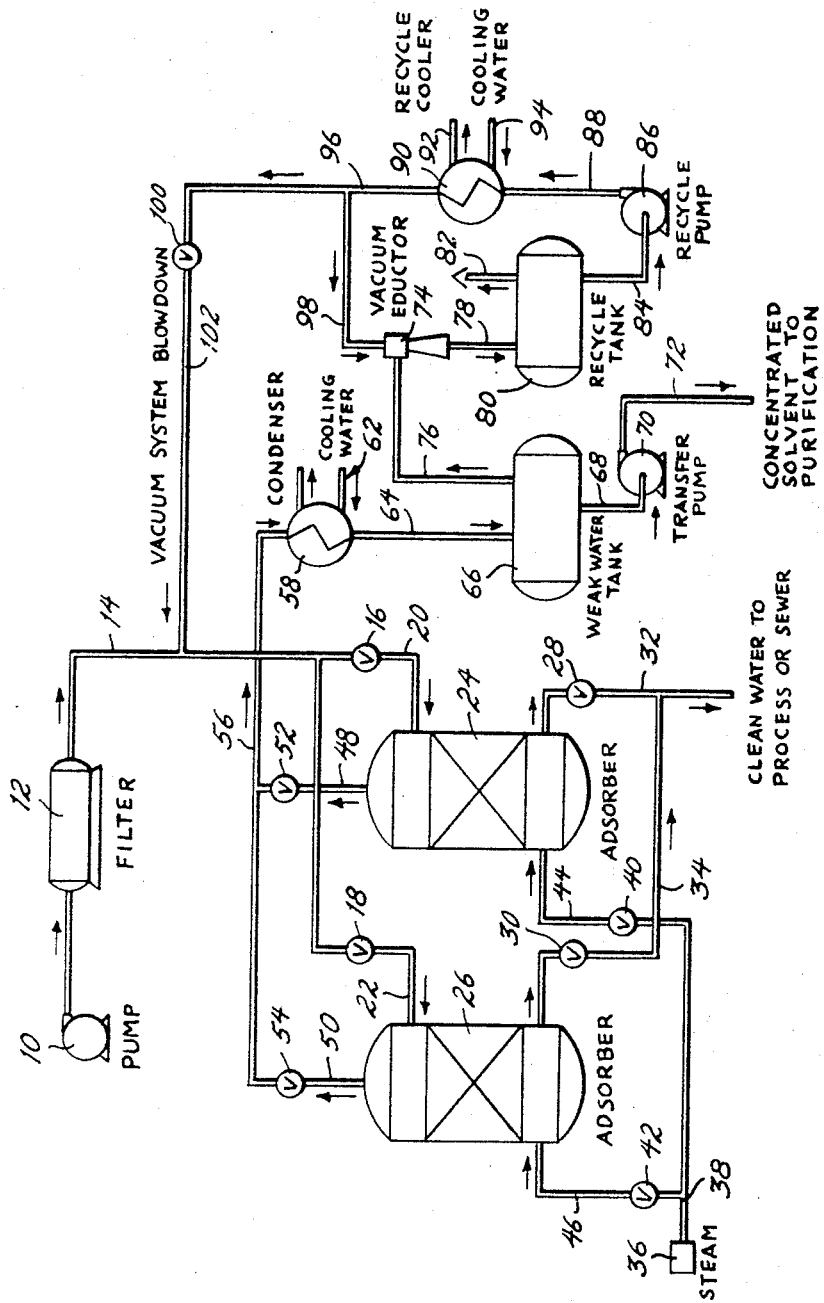

3,448,042
PROCESS FOR CONCENTRATING ORGANIC MATERIAL FROM AN AQUEOUS STREAM
Manlio M. Mattia, Upper Darby, and Bernard M. Weiss, Philadelphia, Pa., assignors to Day and Zimmermann, Inc., Philadelphia, Pa., a corporation of Maryland
Filed Mar. 28, 1966, Ser. No. 537,813
Int. Cl. C02b 1/04, 1/16, 1/46
U.S. Cl. 210—26   3 Claims

ABSTRACT OF THE DISCLOSURE

A process for removing organic materials from an aqueous stream comprises passing the aqueous stream through an adsorbent bed, stripping the adsorbent bed by simultaneously applying steam and a vacuum, and condensing the mixture of steam and organic materials removed from the bed. The condensed mixture is fed to a weak water tank where the organic materials may be recovered. The uncondensed vapor in the weak water tank is removed by a vacuum and recycled. A portion of the recycled vapor is fed to the adsorbent bed through a vacuum system blowdown. Two adsorbent beds are used in order that one can be regenerated while the other has the aqueous stream directed therethrough.

---

This invention relates to a process for concentrating organic materials in aqueous streams and more particularly to a process for concentrating organic material which is dissolved in plant effluents, plant recycle streams, and process streams.

Plant effluents, process streams and plant recycle streams frequently contain dissolved and/or emulsified organic material in concentrations which are too low to be recovered economically. Such dissolved and/or emulsified material is undesirable for many reasons. For example, increased concentration of such dissolved material in recycle streams can reduce the operating efficiency of the process. Also, pollution and contamination problems can arise where such dissolved material is in plant effluents. Furthermore, the dissolved material may comprise valuable organics, but uneconomical to recover by evaporation or distillation because of low concentration.

It is an object of the present invention to provide an improved process for recovering dissolved and/or emulsified organic material from aqueous streams.

It is a further object of this invention to provide a process for regenerating an adsorption bed in situ which bed is utilized in a liquid adsorption system.

It is another object of this invention to provide a process which utilizes a combination of vacuum and steam for stripping organic material from an adsorption bed.

It is another object of this invention to provide a process which utilizes a vacuum throughout the regeneration cycle of an adsorption bed to recover organic material.

It is another object of this invention to provide a process which can be utilized to recover organic material which may be thereafter reused without further purification.

It is another object of this invention to provide a process which can be used for the recovery of dissolved material in an aqueous stream wherein the materials are present in the range of approximately 50 parts per million to approximately 3 percent concentration by weight.

Other objects will appear hereinafter.

The process of the present invention comprises passing the aqueous stream through an adsorbent bed. The adsorbent bed may comprise porous activated carbon, porous silica gel, porous alumina, or other suitable adsorption agent. The organic material, or adsorbate, is concentrated on the surface of the adsorbent by adsorption. The clean water may be recirculated in the process or discharged as waste. Examples of organic material adsorbates which may be concentrated on the adsorbent bed include any of the commercially encountered organic materials, which are dissolved and/or emulsified with water in low concentration in existing technologies. The term "dissolved" as used herein is meant to include the formation of stable emulsions. Examples of organic materials which may be processed in accordance with this invention include phenols from waste streams, oil emulsions, dissolved hydrocarbons in low concentrations, and organic chemicals such as alcohols and amines. The process of this invention is intended to be used where the adsorbate is present and the aqueous stream and the range of approximately 15 parts per million to approximately 3 percent concentration by weight, preferably between 50 and 1,000 parts per million concentration by weight.

In a preferred embodiment, at least two adsorbent beds are provided so that the process may be continuous. Thus, while the aqueous stream is directed through one adsorbent bed another adsorbent bed may be regenerated. In accordance with the process of this invention, the adsorbate is recovered and the adsorbent bed is regenerated in the following manner. The adsorbent bed may be initially purged of all liquid with air or other nonreactive gas. Thereafter, steam is introduced below the adsorbent bed to strip off the adsorbed material. This steam could also be used to purge the adsorbent bed and thereby eliminate the purging with air. A vacuum is simultaneously applied to the adsorption bed to aid in the desorption of adsorbate therefrom. A wide range of vacuum conditions may be used, with a suitable vacuum for this purpose being 3 pounds per square inch absolute. The effect of the steam and the vacuum is to strip off substantially all of the material which has been adsorbed. The steam-vapor mixture released as the result of the desorption leaves the adsorption tank and is condensed and collected in a weak water tank. The vacuum is also effective to force this mixture to enter the weak water tank. The organic material is relatively concentrated and may constitute approximately 20–30 percent of the mixture in the weak water tank so that distillation of the mixture becomes practical. If the recovered material is insoluble in water, it may be separated by decantation.

Any suitable means may be utilized to create the vacuum. A low level eductor condenser with a re-cycle water pump and cooler may be used, or a vacuum pump, or steam jet, or any other suitable mechanism. The selection of a particular vacuum system to be used is dependent upon the physical properties of the adsorbed material.

For the purpose of illustrating the invention, there is shown in the drawing a form which is presently preferred; it being understood, however, that this invention is not limited to the precise arrangements and instrumentalities shown.

The drawing is a diagrammatic view of the system of the present invention.

Referring to the drawing in detail, a pump 10 is utilized to deliver an aqueous stream containing dissolved organic material to a filter 12. The filter 12 is utilized to remove suspended particles from the aqueous stream. Other equipment such as settling tanks may be required depending upon the concentrating and physical properties of the suspended particles.

A pair of adsorption tanks 24 and 26 are shown in the drawing. For purposes of the following description, it will be assumed that the aqueous stream containing the dissolved organic material is flowing through the adsorption tank 24 and that the adsorption tank 26 is being regenerated. Under these conditions, valves 16, 28, 42, and 54 will be open while valves 18, 30, 40 and 52 will be closed.

The aqueous stream passes through the filter 12 and flows through feed line 14 into line 20. The stream enters adsorption tank 24 and flows down through an adsorption bed which may contain porous activated charcoal, silica gel, alumina, or any other suitable adsorbent. The dissolved organic material in the aqueous stream is adsorbed by the adsorption bed. The purified stream flows through line 32 and may thereafter be recirculated or discharged as waste.

While the aqueous stream is flowing through tank 24, tank 26 is being regenerated. Steam from a source 36 flows through line 38 into line 46 and enters the tank 26 below the adsorption bed. The tank 26 may initially be purged of liquid by passing air through it, or steam from source 36 may be utilized to initially purge the tank. The steam which is utilized may be superheated. The steam flows through the adsorption bed and strips off the adsorbed organic material. A vacuum is maintained in the tank so that stripping occurs at reduced pressure. The vacuum is created by a vacuum eductor 74 as will be fully explained hereinafter. The combined effect of the steam and the vacuum strips substantially all the adsorbate from the adsorbent bed.

The combined effect of the steam and the vacuum is particularly effective where the organic material has a relatively low vapor pressure. The steam and vacuum create a favorable differential pressure between the material adsorbed in the adsorbent bed and the material present in the stripping vapor. Thus, the partial pressure of the adsorbed material is greater than the partial pressure of the material in the vapor phase so that stripping of the adsorbed organic material more readily occurs. The combined effects of the steam and vacuum may be further exemplified by the equation:

$$Y = P/P'$$

where:

$Y$ = the mole fraction of organic material in stripping vapor from the adsorbent bed;
$P$ = partial pressure of the organic material;
$P'$ = total pressure of the system.

Thus, in order for Y to be a maximum, the total pressure of the system must be kept at a minimum.

The steam and organic material flow through line 50 and 56 into condenser 58. Means indicated generally as 60 is provided to cool the condenser 58. Cooled water from a source indicated generally as 62 is used to effect cooling by heat-exchange to condense the steam and stripped organic material.

The condensed steam and organic material mixture flows through line 64 into a weak water tank 66. If the organic material in the weak water tank is insoluble in water, it is separated by decantation; if the organic material is soluble in water, it is separated by distillation. A transfer pump 70 draws the organic material through line 68 and pumps the material through line 72 to a purification system which may further process the concentrated material. In the drawing, the organic material is shown as removed from the bottom. In many cases, it would be removed from the top of weak water tank 66, as by decantation.

The uncondensed vapor is drawn from the weak water tank 66 through line 76 by means of the vacuum. The vacuum may be produced by means of a vacuum pump, steam jet, low level eductor condenser or other suitable vacuum producing equipment. As shown in the drawing the vacuum is produced by a vacuum eductor 74. Water containing a minor amount of material is delivered to vacuum eductor 74 through the system including recycle tank 80, recycle pump 86, recycle cooler 90, and lines 84, 88, 96 and 98. The recycle tank 80 is provided with an escape valve 82 which exhausts to atmosphere when such escape valve 82 is open.

Recycle cooler 90 maintains a constant temperature in the recycle stream by removing heat absorbed in condensing the vapors delivered from the weak water tank. A cooling means 92 operates to reduce the temperature of the recycle stream. A cooling water supply 94 is utilized to effect cooling through heat exchange in cooling means 90.

A feed line is provided so that a buildup of the recovered organic material, which may enter the vacuum system as vapor, will not occur in the vacuum system. Periodically valve 100 is opened and the recycle stream is added to the aqueous stream which flows into the adsorption tanks 24 and 26. Thus, a blowdown system is provided for the vacuum system. The use of a vacuum system blowdown enables a quantitative recovery of the organic material. This system would be used primarily if the organic material was valuable so that substantially all of said material could be recovered. After the adsorption bed in tank 24 has become saturated, the valves 16, 28, 42 and 54 will be closed and valves 18, 30, 40 and 52 will be open and the aqueous stream will be directed through the adsorbent bed in tank 26 and the adsorbent bed in tank 24 will be regenerated.

After the valves have been reversed, the aqueous stream will flow through line 14 into line 22 and through the adsorbent bed in tank 26. The purified stream will flow through line 34 and may thereafter be returned to process or discharged as waste.

Steam may flow through line 38 and 44 and into adsorption tank 24. The adsorbate is stripped from the adsorbent bed as explained with reference to the regeneration of tank 26 as set forth above. The mixture of steam and organic material flows through lines 48 and 56 to the condenser 58. Thereafter, the process is the same as described above with reference to the regeneration of the adsorption tank 26.

The process of the present invention enables quantitive removal of organic materials from an aqueous stream using a fixed adsorbent bed. No movement of the bed is required during regeneration.

Quantitative removal of phenol from phenol-water solutions containing between 50 and 1,000 parts of phenol in the initial waste water stream can be effected with virtually no phenol remaining in the purified water.

The present invention may be embodied in other specific forms without departing from the spirit or essential attributes thereof and, accordingly, reference should be made to the appended claims, rather than to the foregoing specification as indicating the scope of the invention.

We claim:

1. A process for removing organic material from an aqueous stream containing between 50 parts per million and 3 percent concentration by weight of dissolved organic material comprising passing the aqueous stream containing the dissolved organic material through an adsorbent bed, adsorbing the organic material from the aqueous stream on the adsorbent bed, passing steam through the adsorbent bed, simultaneously applying a vacuum to the adsorbent bed, removing a mixture of steam and organic material from the bed, condensing the mixture, feeding the condensed mixture to a weak water tank, applying a vacuum to remove the uncondensed vapor from the weak water tank, recycling the removed vapor through a recycle tank, a recycle pump, and a recycle cooler, and applying a portion of the thusly recycled vapor to the adsorbent bed through a vacuum system blowdown.

2. The process set forth in claim 1 wherein the adsorbent bed is activated carbon.

3. A method in accordance with claim 1 in which steam is passed into the adsorbent bed prior to the simultaneous application of vacuum to the bed.

(Reference on following page)

References Cited

UNITED STATES PATENTS

| | | | |
|---|---|---|---|
| 1,866,417 | 7/1932 | Mackert | 210—32 |
| 2,336,493 | 12/1943 | Marks | 203—92 X |
| 2,339,386 | 1/1944 | Edwards | 210—32 |
| 2,585,490 | 2/1952 | Olsen | 210—26 X |
| 2,804,427 | 8/1957 | Suriano | 203—92 |
| 2,935,452 | 5/1960 | La France et al. | 203—92 |

SAMIH N. ZAHARNA, *Primary Examiner.*

U.S. Cl. X.R.

210—32, 40